(12) United States Patent
Tsao

(10) Patent No.: US 9,106,677 B2
(45) Date of Patent: *Aug. 11, 2015

(54) METHOD AND APPARATUS FOR WEB BASED STORAGE ON-DEMAND

(71) Applicant: Sheng Tai (Ted) Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/530,613

(22) Filed: Oct. 31, 2014

(65) Prior Publication Data

US 2015/0106496 A1   Apr. 16, 2015

Related U.S. Application Data

(60) Continuation of application No. 13/663,710, filed on Oct. 30, 2012, now Pat. No. 8,909,976, which is a division of application No. 12/013,813, filed on Jan. 14, 2008, now Pat. No. 8,639,788, which is a division of application No. 10/713,905, filed on Aug. 12, 2002, now Pat. No. 7,379,990.

(60) Provisional application No. 60/402,626, filed on Aug. 12, 2002.

(51) Int. Cl.
| | |
|---|---|
| *G06F 11/00* | (2006.01) |
| *H04L 29/08* | (2006.01) |
| *G06F 11/07* | (2006.01) |
| *G06F 11/20* | (2006.01) |
| *H04L 12/24* | (2006.01) |
| *G06F 3/06* | (2006.01) |

(52) U.S. Cl.
CPC .......... *H04L 67/1097* (2013.01); *G06F 3/0604* (2013.01); *G06F 3/067* (2013.01); *G06F 3/0647* (2013.01); *G06F 11/0727* (2013.01); *G06F 11/2038* (2013.01); *G06F 11/2094* (2013.01); *H04L 41/0663* (2013.01); *G06F 11/2056* (2013.01)

(58) Field of Classification Search
CPC ............ G06F 11/1461; G06F 11/1464; G06F 11/1456
See application file for complete search history.

(56) References Cited

U.S. PATENT DOCUMENTS

| | | | |
|---|---|---|---|
| 2002/0143999 A1* | 10/2002 | Yamagami | 709/249 |
| 2005/0144254 A1* | 6/2005 | Kameda | 709/217 |
| 2006/0129608 A1* | 6/2006 | Sato et al. | 707/200 |
| 2013/0007391 A1* | 1/2013 | Crescenti et al. | 711/162 |

* cited by examiner

*Primary Examiner* — Yolanda L Wilson

(57) ABSTRACT

Rapid demanding for storage capacity at internet era requires a much flexible and powerful storage infrastructure. Present invention disclosed a type of storage system based a model of centrally controlled distributed scalable virtual machine. In this model, one or more service pools including virtual storage service pool and application service pools can be automatically created to meet the demands for more storage capacity from various applications. Specially this model provide a solid foundation for distributing storage volumes for supporting storage on-demand and sharing with exceptional management capabilities. In addition, this model provides a flexible fault recovery topology beyond the traditional recovery plan.

20 Claims, 8 Drawing Sheets

Distributed Virtual SAN Infrastructure

The UDP packet format used by "Virtual SAN Auto Configuration Protocol"

Example of Storage Volume Information of an IP SAN Unit

Note: Each volume may further be partitioned into small chunk of partition.

A Hypothetical Example of Storage Volume Requests and Assignments

Direct Attached Storage System:

In-Band Accessed Virtual SAN

Recovery Scheme of the Distributed Virtual SAN Infrastructure

METHOD AND APPARATUS FOR WEB BASED STORAGE ON-DEMAND

CROSS-REFERENCE TO RELATED APPLICATION(S)

The present application is a continuation patent application of a U.S. patent application Ser. No. 13/663,710 filed on Oct. 30, 2012, which in turn itself is a divisional application of U.S. patent application Ser. No. 12/013,813 filed on Jan. 14, 2008 and now a U.S. Pat. No. 8,639,788, which in turn itself is a divisional application of U.S. patent application Ser. No. 10/713,905 filed on Aug. 12, 2002, converted from provisional application 60/402,626 and now a U.S. Pat. No. 7,379,990. The application Ser. No. 10/713,905 has also referenced provisional application No. 60/401,238. All above applications are herein incorporated by references in their entireties for all purpose.

FIELD OF THE INVENTION

The present invention generally relates to computer communications network. More specifically, the present invention relates to web based data storage systems.

BACKGROUND OF THE INVENTION

Today's corporate IT professionals typically face many challenges to handle the ever increasing information and data. To handle large amount of data, many organizations expand their storage capacity by employing manage storage systems locally in order to maintaining their normal business operating. A conventional approach is to use IP based network attached storage ("NAS"), which effectively provides data storage and services for end users. Moreover, at the enterprise level, the majority storage systems are directly attached or connected to server(s) or host(s) as shown in FIG. 7. These server(s) and/or host(s) are typically access to raw block data devices through conventional communication connection media, such as traditional IDE, SCSI, Fibre Channel, or Ethernet.

The server, which is directly attached to a storage system as illustrated in FIG. 7 typically has many drawbacks, which are described as following:

a typical conventional storage management system is only capable of handling 4 TB (terabytes) of data, which is usually not good enough to meet the demands for more storage capacity in an enterprise environment;

The most of servers, which are directly attached to storage systems, have problems for further expanding their storage capacity. For example, it may require to purchase new servers in order to increase storage capacity;

The storage being attached to a server can only be accessed by the attached server and can not be shared by other servers even if server's storage availability is not evenly distributed across all servers within a organization;

Each attached storage system has to be managed separately and this is a nightmare for IT professionals;

With the attached storage system, the backup/restore has to go through the data network, this will tax or reduce the network performance;

A typical SCSI connection only allows a 12-meter distance for data accessing with 15 storage devices. Similarly, Fibre Channel is limited to 10 kilometers communication distance. Distance limitation effectively prevents them from being the best choice for disaster recovery of the storage system; and The Fiber Channel based storage system cannot handle well for the interoperability. Also, Fibre Channel based storage system is expensive to build and to maintain.

FIG. 8 shows a conventional type of virtual SAN, which is in-band controlled and accessed with which the data path from hosts (1 of FIG. 8) to the SAN units (4 of FIG. 8) going through virtual SAN control management station (2 of FIG. 8). It is not efficient in term of accessing the data by the hosts because the virtual SAN control management station can easily be a performance bottleneck. Similarly, the scalability of this type of virtual SAN is poor.

SUMMARY

With rapid development of high speed communication technology, the problems mentioned above can be solved by an IP based out-band accessed distributed virtual SAN infrastructure illustrated in FIG. 1 of present invention. In referencing to the FIG. 1, each host 1 can directly access IP based SAN units 4 without going through control management station ("control system") 3. The IP based out-band accessed distributed virtual SAN infrastructure actually represents an example of central controlled distributed scalable virtual machine system (CCDSVM) illustrated in FIG. 9. Wherein, each system units actually is a SAN unit 4, specifically is an IP based SAN unit.

With this invention, in one embodiment, each SAN unit 4 can be accessed by one or more hosts 1 and each host 1 can access one or more SAN units 4 as illustrated in FIG. 6. In addition, the storage access goes directly through communication link 2 between hosts 1 and SAN units 4 without involvement of the control management station 3. Further, a new SAN unit 4 can be dynamically added at any time without interrupting current data access of SAN units 4 by hosts 1. In addition, all SAN units are centrally controlled, monitored, and managed by a control management station 3 through a management console 10 of a console system 14. The control management station 3 may also accept storage volume/partition requests from each host 1, and assign the matched volumes/partitions of the SAN units 4 to the requested hosts. Therefore, each host 1 could directly access the right volumes/partitions of assigned SAN units without going through the control management station 3 again.

This invention will become understood with reference to the following description, claims, and accompanying figures.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The following terms are used through out this patent application to describe the present invention. A central controlled distributed scalable virtual machine ("CCDSVM") system allows a control management station to control a group of computing systems and to provide distributed services to client systems across the Intranet, Internet, and/or LAN environment. Storage media includes magnetic hard disk drives, solid state disk drives, optical storage drive, and memory card, etc. Storage connection and control media may include controller of IDE, SCSI, Fibre optical, Ethernet, USB, or wireless media, and/or other related cables etc. Each controller of storage media such as Raid, IDE, or SCSI controller may control multiple storage media drivers in a computing system. Storage system includes one or more storage media devices, storage connections, and/or storage media controllers. Storage system also contains related software modules for delivering storage services.

Storage area network ("SAN") is a storage system that is capable of providing block data services to various computer devices through storage connection media, such as Fibre-optical cable, Ethernet cable or other media by deploying Internet Protocol ("IP") based or non-IP based protocol. The non-IP based protocol, in one example, includes Fibre-Channel protocol. IP SAN uses IP based protocols to provide storage raw block data services. All discussions of the SAN in this invention are within the scope of a model of central controlled distributed scalable virtual machine ("CCDSVM").

DNS stands for domain name service for the Internet network. DNS is an Internet software infrastructure and is capable of identifying network addresses and name for computing systems. For example, the network addresses may be used to communicate with the peer systems of a computing device. A Simple Network Management Protocol ("SNMP") is a standard Internet protocol. A SNMP trap is a user datagram protocol ("UDP") packet, which may be used to send by a SNMP daemon on a SNMP agent system to a SNMP network management station via network links.

Figure 1:
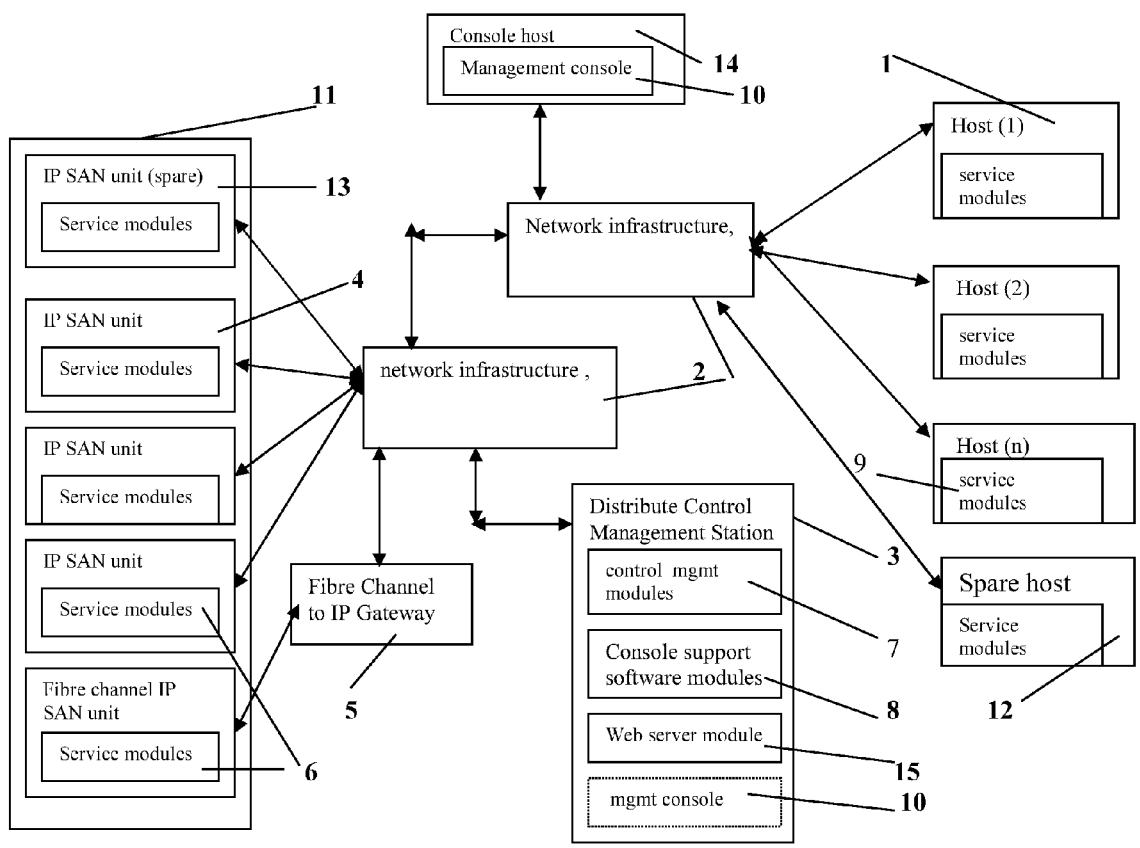
FIG. 1 illustrates a distributed virtual storage area of network ("SAN") infrastructure in accordance with one embodiment of the present invention.

FIG. 1 shows an example of a simplified block diagram of IP based out-band accessed distributed virtual SAN infrastructure. The distributed virtual SAN infrastructure includes a plurality of hosts 1, network infrastructures 2, a control management station 3, a virtual storage service pool 11 of a plurality of IP SAN units 4, and a management console 10. In one embodiment, each of the hosts 1 contains service software modules 9. The service software modules 9 are configured to communicate with a control management software module 7 of the control management station 3 for obtaining information of a specific one of the IP SAN units 4. The service software modules 9 also operable to communicate with service software modules 6 of each of the IP SAN units 4 for access to block data provided by the each of the SAN units 4. For example, each of the hosts 1 can create a local file system or create a local database by requesting and using raw block data of a storage volume provided by one of the SAN units 4. The service software modules 9 can be coded or implemented with any suitable programming languages such as C, C++, Java or others. The service software modules 9 may also use any suitable protocols such as IP based or non-IP based protocols.

The host 1, in one embodiment, could be a server, a desktop, a laptop PC, or a communication device etc., which needs to access block data storage. The spare host 12 represents a part of recovery scheme that could be implemented in a CCDSVM environment.

Network infrastructure 2 comprises many kind of communication links. The network infrastructure 2 could be a storage backbone of an enterprise, a department LAN, a corporate intranet, an Internet infrastructure or others. In one embodiment, network infrastructure 2 includes switches, routers, gateways, cables (Ethernet, optical Fibre), wireless communication media, or others. The network infrastructure 2 provides data path between the hosts 1, the distribute control management station 3, and the SAN Units 4. The network infrastructure 2 also includes software infrastructure such as DNS or DHCP for facilitating a computing device to identifying a designated addresses of a designated computing device for sending or receiving data within a network domain or in a cross-domain network environment.

It should be noted that DNS and/or other Internet address identification mechanism may be used when a message or data stream is sent from a system A to a system B.

The control management station 3 includes distributing control management software modules 7 and console support software modules 8. To support web-based console, it requires the web server software 15. The distribute control management software modules 7 communicate with service modules 6 of each of the IP SAN units 4 and are operable to retrieve storage information for constructing a virtual SAN storage service pool 11. The communication between the distributed control management software modules 7 and the service modules 6 of each of the IP SAN units 4 is further configured to monitor each of the IP SAN units, and to perform various system operations, which include storage configuration and partitioning etc. The control management software modules 7 also communicate with service software modules 9 of each of the hosts 1 for distributing storage volumes to each of the hosts 1 upon a request. The distribute control management software modules 7 can be implemented with any suitable programming languages such as C, C++, Java, XML, etc. The communication protocols between control management station 3 and IP SAN units 4 could be any suitable IP based protocols. The communication between control management station 3 and hosts 1 can be any suitable IP base or non-IP based protocols.

The console support software modules 8 employ inter-process communication mechanism to obtain information relating to each of the IP SAN units (4) from the distributed control management software modules 7. The console support software modules 8 further provide information to web server software 15 through the inter-process communication mechanism. The console support software modules 8 can be implemented with any suitable programming languages such as C, C++, Java, XML, etc.

The web server software 15 communicates with management console software 10 of the console host 14 through web protocol such as HTTP. The web server software 15 is configured to provide end-user a centralized storage management capability within the entire distributed virtual SAN infrastructure cross network. The web server software 15 could be commercially available software or other proprietary software.

To simplify foregoing discussion, the communication path mentioned above will be simply referred to as the console support software modules 8 communicate (send/receive data) with the management console 10 of the console host 14 without further mentioning the role and function of web server software 15 of the distribute control management station 3.

In addition, to support non-web based console, the web server software 15 on the control management station 3 is often not required. In this case, the console support software modules 8 could communicate with the management console software 10 with a suitable protocol other than a web protocol such as HTTP.

Figure 5:
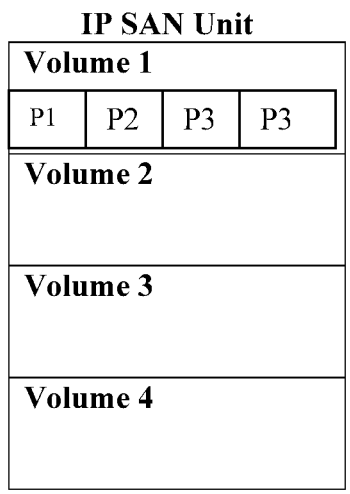
FIG. 5 illustrates an example of storage volume information of an IP SAN Unit in accordance with one embodiment of the present invention.

The virtual storage pool 11 includes a plurality of IP SAN units 4, wherein each of the IP SAN units further includes service modules 6 and is configured with storage media, storage communications and control media. The storage media of each of the IP SAN units 4, for example a disk drives, is configured to have one or more logical volumes. Each storage volume, in one embodiment, is further partitioned into several partitions as shown in FIG. 5. Each of the IP SAN units 4 further comprises block data service and other service software modules 6. The service software modules 6 is configured to communicate with distribute control management station 3 for providing storage information and for performing storage operations. The service software modules 6, in another embodiment, are further configured to communicate with service software modules 9 of each of the hosts 1 for providing block data services to the each of the hosts 1. The service software modules 6 can be implemented by any suitable programming languages such as C, C++, Java, etc and they may employ any suitable IP based communication protocols.

In one embodiment, the control management station 3 organizes the IP SAN units 4 to form the virtual storage service pool 11. The virtual storage pool 11 may contain information relating to IP addresses, the storage volumes of the block data, their addresses and sizes for each of the IP SAN units 4. A spare IP SAN unit 13 in one embodiment represents a part of recovery scheme used in the centrally controlled distributed scalable virtual machine environment.

A Fibre channel to IP gateway 5 in one embodiment is a component that is configured to provide translation between Fibre Channel based protocol and IP based protocol so that any Fibre Channel based SAN unit in the distributed virtual SAN infrastructure will appear as if a IP based SAN unit to the rest of the distributed virtual SAN infrastructure illustrated in FIG. 1.

Fibre channel SAN unit is similar to an IP SAN unit 4 except it uses Fibre Channel storage controller, which uses Fibre Channel protocol to communicate with other parties over a fiber channel network. In addition, any Fibre Channel SAN unit appears as an IP based SAN unit to the distributed virtual SAN once it connects to the Fibre Channel to IP gateway 5. Therefore, to simplify the foregoing discussion, a fibre channel SAN unit will be treated similarly as an IP SAN unit in all of following discussion without additional comments.

The management console 10 of the console host 14, which has been described in pending patent application of "Concurrent Web Based Multi-Task Support for Control Management System" by the same author and is incorporated herein by reference in its entirety. The management console 10 could be a commercially available web browser or a proprietary Web browser. A web browser 10 is able to communicate with web server software 15 on the control management station 3 through a web protocol such as HTTP. The Web browser 10 could be implemented by any suitable programming languages such as C, C++, Java, XML, etc. In addition, the management console software module 10 could be a networked software module other than a web browser software. In this case, any other suitable network protocols can be used instead of using web protocol such as HTTP.

To simplify the foregoing discussion, the communication path between the management console 10 of the console host 14 and the console support software modules 8 of the control management station 3 will not further mention the role or function of the web server software module 15 in this invention.

From the management console 10, multiple concurrent system operations and tasks can be performed by user for the entire distributed virtual SAN infrastructure. There are may be one or more management consoles of the distributed virtual SAN infrastructure anywhere across the communication network.

Figure 2:
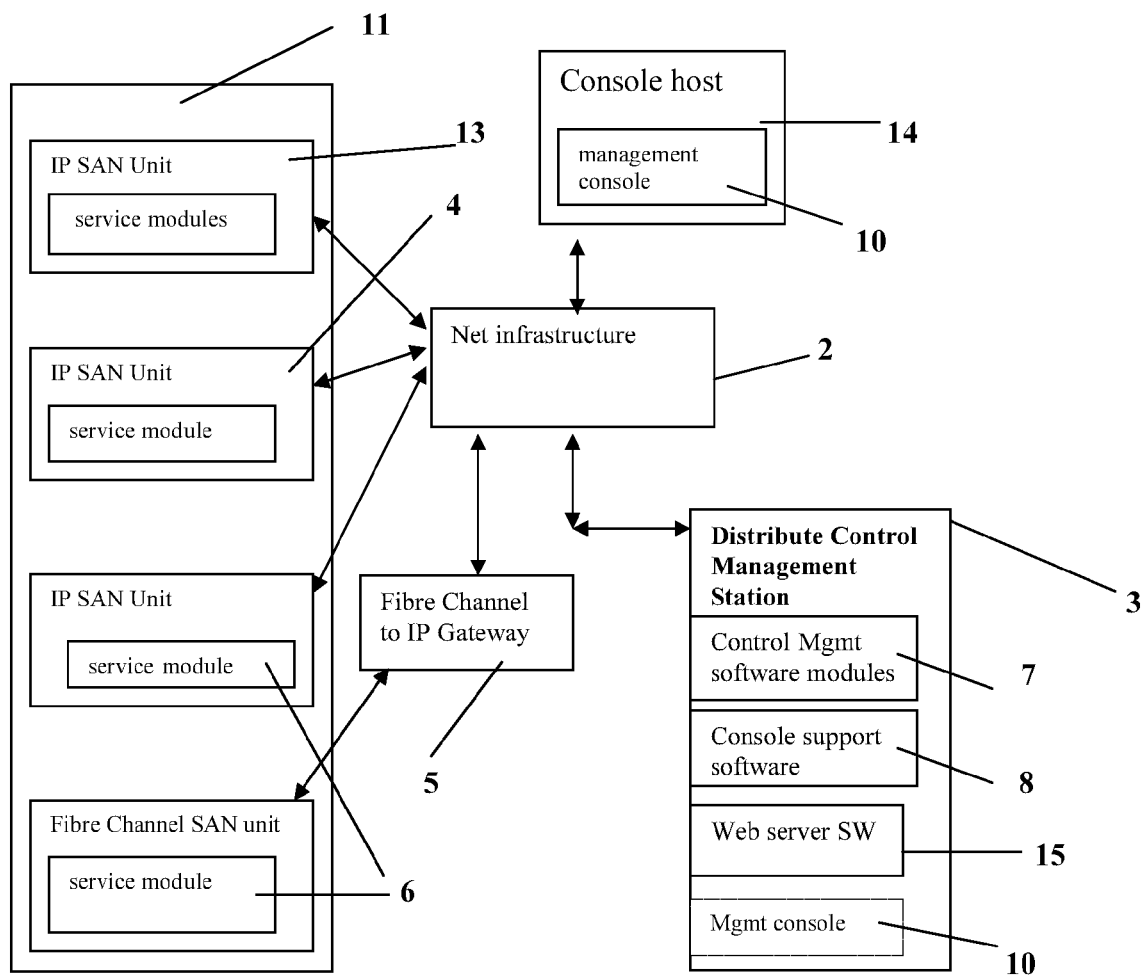
FIG. 2 illustrates actual components of Distributed Virtual SAN in accordance with one embodiment of the present invention.

FIG. 2 illustrates a portion of FIG. 1 relating to an actual virtual SAN. The plurality of SAN units 4 form a virtual storage service pool 11. The virtual storage service pool 11 may contain information of each of the IP SAN units' IP address, the storage volumes configured on each storage device and their sizes, etc.

Figure 3:
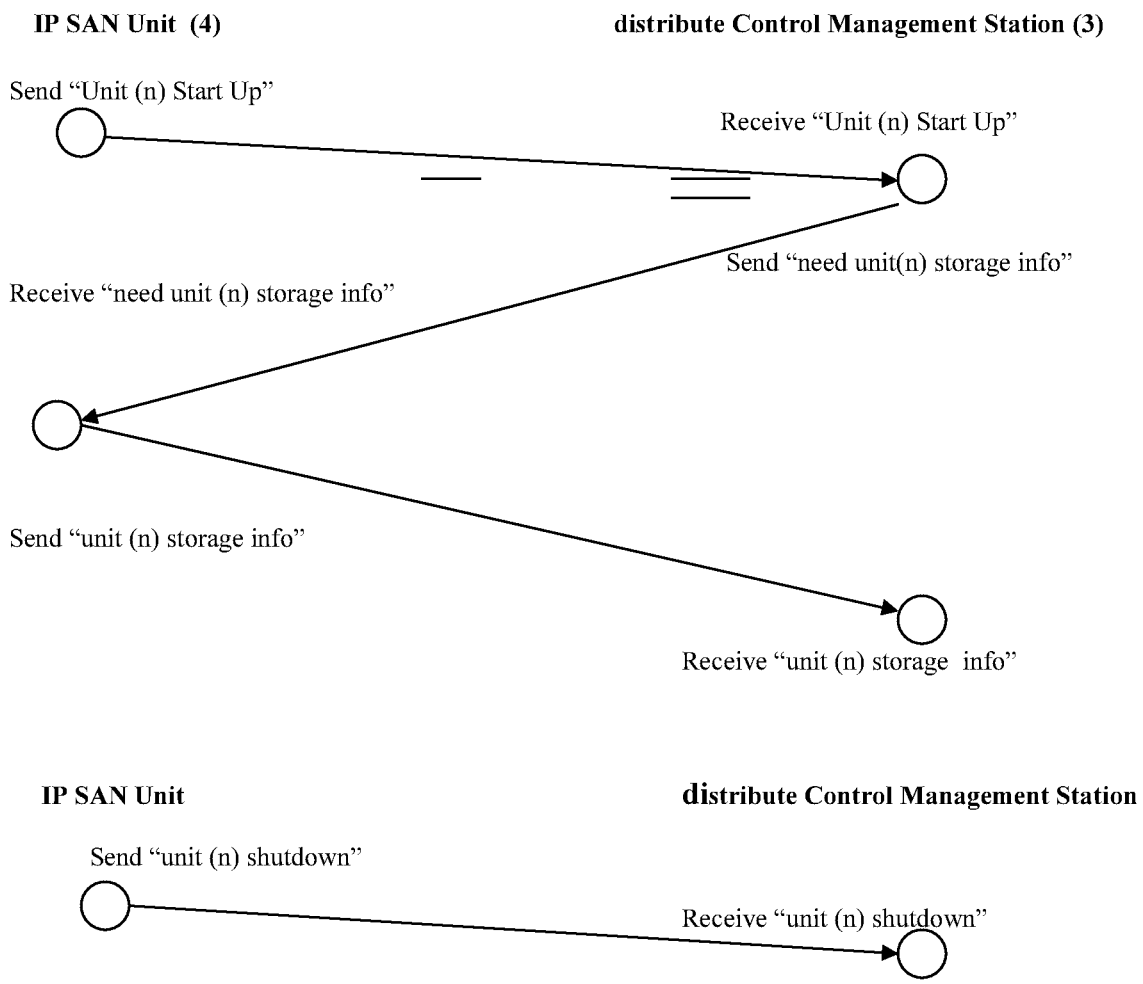
FIG. 3 illustrates Virtual SAN automatic configuration protocol in accordance with one embodiment of the present invention.

FIG. 3 shows a protocol for a virtual SAN automatic configuration as well as shutting down a SAN unit 4 in the virtual storage service pool 11 of virtual SAN. The packet format used with this protocol is described in FIG. 4.

Figure 4:
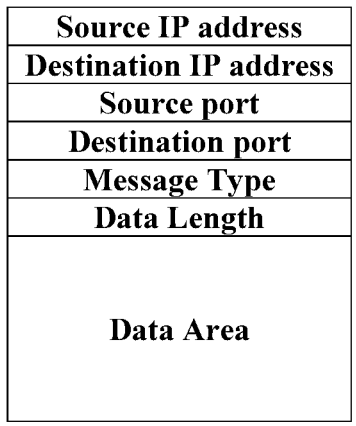
FIG. 4 illustrates packet format for a Virtual SAN auto configuration protocol in accordance with one embodiment of the present invention.

FIG. 4 shows the message format, which is used by "Virtual SAN Automatic Configuration Protocol" for sending and receiving a packet, wherein the source and destination IP address are included that means the storage communication can be independent of naming identification services such as DNS or others in one embodiment.

FIG. 5 illustrates storage layout in an IP SAN unit 4, wherein the storage layout may be further divided into multiple volumes and each of the volumes may be further divided into multiple partitions. Each of the volumes is referred as a logical storage unit in this discussion and it might contain multiple pieces of storage spaces from multiple storage hardware media.

Figure 6:
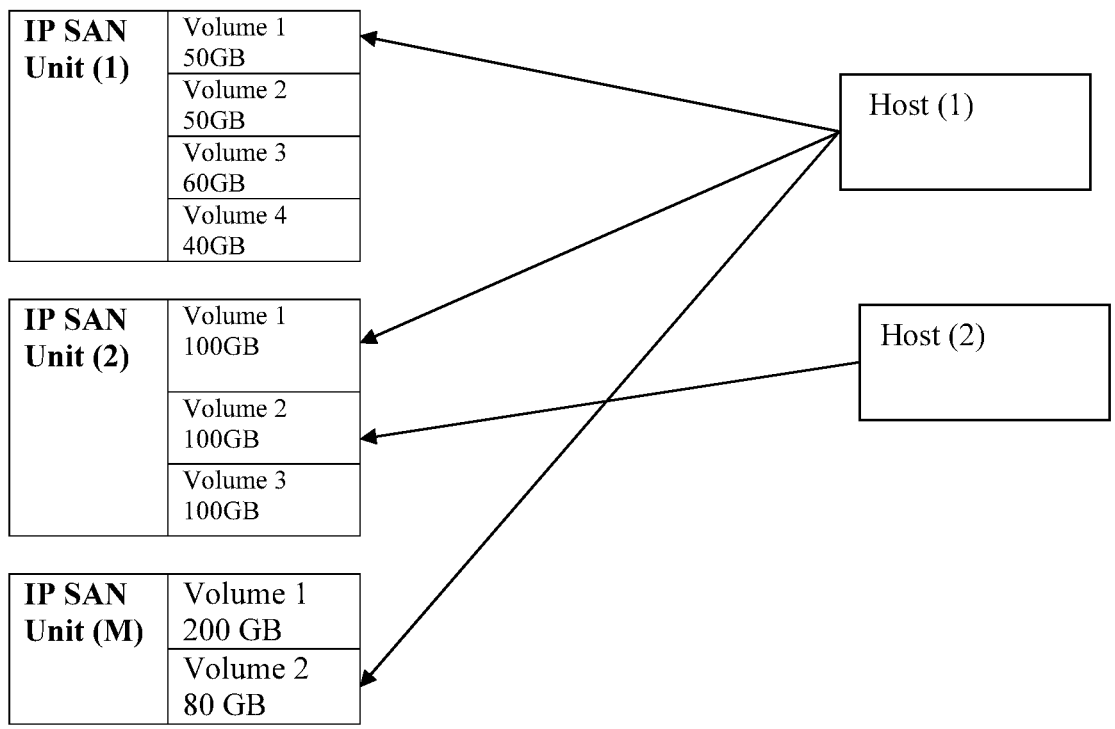
FIG. 6 illustrates a hypothetical example of storage volume requests and assignment in accordance with one embodiment of the present invention.

FIG. 6 is a simplified and a portion of FIG. 1, which shows a hypothetical example of how hosts are configured access to the storage volume of IP SAN units. Where each of the IP SAN units 4 is a portion of virtual storage pool 11 and each of the hosts is substantially the same as presented in FIG. 1.

Figure 8:
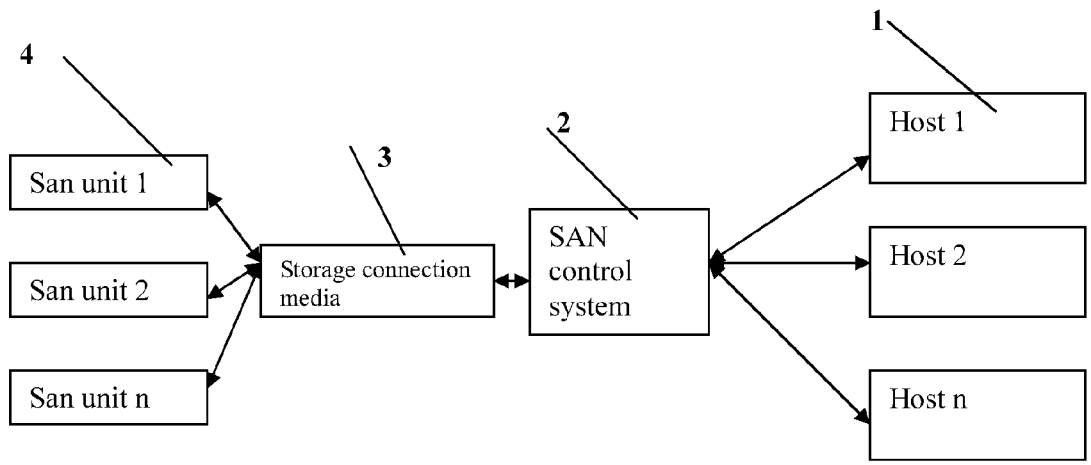
FIG. 8 is an in-bound accessed virtual storage system.

FIG. 8 is a block diagram illustrating an In-Band Accessed Virtual SAN. FIG. 8 shows another type of virtual SAN, wherein, the actual storage data path from hosts to IP SAN units has to go through control management station.

Figure 9:
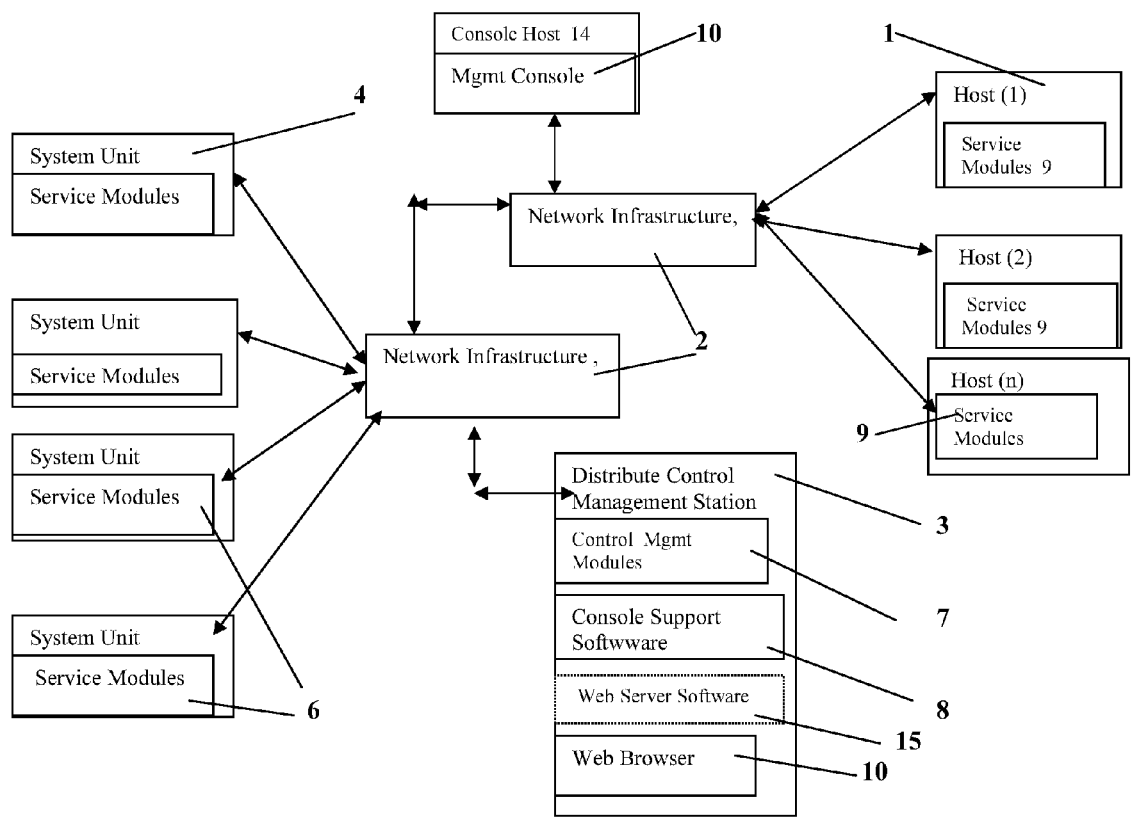
FIG. 9 illustrates a simplified diagram of a central controlled distributed scalable virtual machine system in accordance with one embodiment of the present invention.

FIG. 9 is a Simplified diagram of central controlled distributed scalable virtual machine. With this invention, the systems in a CCDSVM can be flexibly organized into multiple different service pools according to their functionalities. For example, multiple IP SAN units can form a virtual SAN storage pool. The hosts of the CCDSVM could form other service pools to provide services other than storage services such as video services, security monitor services, and all other services provided across the world wide web.

Figure 10:
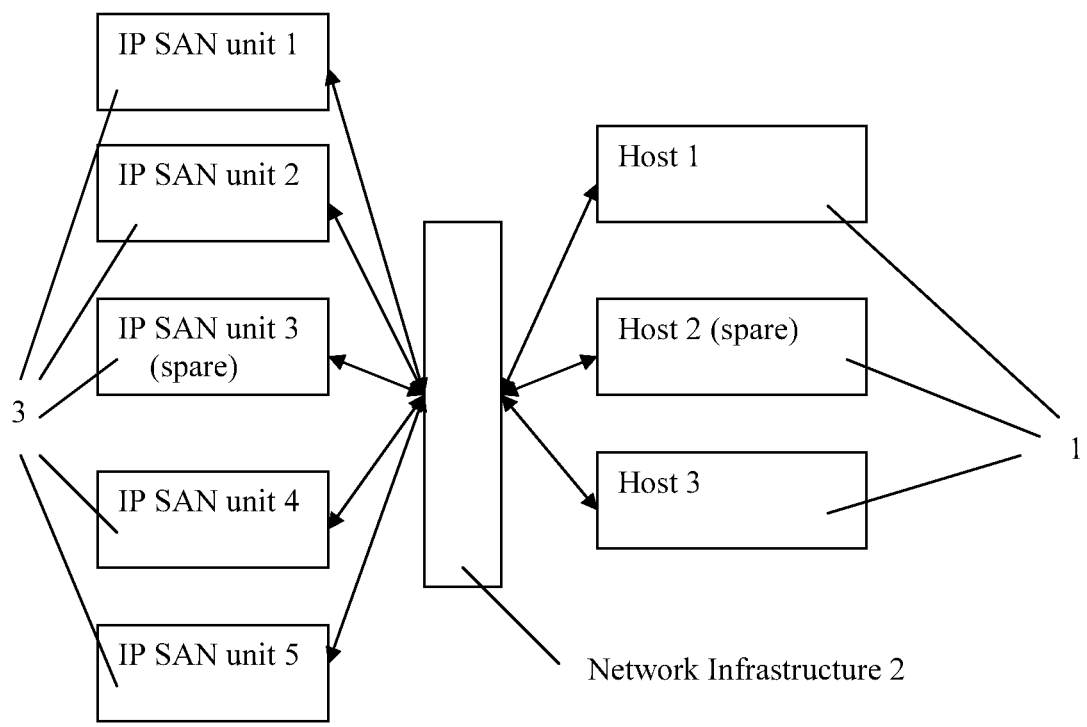
FIG. 10 illustrates a simplified diagram of disaster recovery scheme of a distributed virtual san infrastructure in accordance with one embodiment of the present invention.

FIG. 10 is a simplified diagram of disaster recovery scheme of the distributed virtual SAN infrastructure, which includes one virtual storage service pool of a plurality of IP SAN units and one service pool of a plurality of hosts. For example, host 1 (1) accessible to IP SAN units 1 and 2 while host 1 (3) accessible to IP SAN units 4 and 5. Also, IP SAN units 4 (1) and (2) are mirrored so that they have kept the same copy of data for host 1 (1). The same to be true for IP SAN units 4 (4) and (5) with host 1 (3). In addition, IP SAN unit 4 (3) may be a spare unit and the host 1 (2) could be a spare host for providing fault replacement in case a fault occurred.

FIG. 1 shows a simplified diagram of a distributed virtual SAN infrastructure according to the present invention. With the distributed virtual SAN infrastructure, the distributed virtual SAN storage service pool 11 comprises one or more SAN units 4, which may be further connected to a distribute control management station 3. The SAN units 4 can be accessed by one or more hosts 1 via the network infrastructure 2. The entire distributed virtual SAN infrastructure can be operated through a management console 10.

The virtual storage volume service pool 11 of the distributed virtual SAN infrastructure can be initiated and updated when each of the IP SAN units 4 is booted and brought to online. The virtual storage volume service pool 11, in one embodiment, is updated when at least one of IP SAN units is powered down or removed from the web environment. FIG. 3 shows the distributed Virtual SAN Automatic Configuration Protocol, which leads to the success of constructing the virtual storage service pool 11 of the distributed virtual SAN infrastructure according to this invention. The following steps are for automatic building the storage volume service pool of the distributed virtual SAN based on the protocol illustrated in FIG. 3. The protocol described bellow could be IP based protocol such as SNMP, or a much simple UDP based protocol as illustrated in FIG. 4, or any other suitable protocols.

When any one of the IP SAN units 4 such as unit (n) brought up online, SAN service modules 6 of the one of IP SAN unit 4 sends out a "SAN unit (n) startup" packet, as illustrated in FIG. 4, to the distribute control management station 3. The "SAN unit (n) startup" packet could be a simple user defined UDP packet indicating information about a storage unit with a number "n" just being powered up. The message carried by the packet could also be a SNMP trap of cold start packet, or link-up packet 4 or other short packet/message of any suitable IP protocols.

When the distribute control management modules 7 of the distribute control management station 3 detects and receives the IP SAN unit (n)'s message, it stores the IP SAN unit (n)'s information, such as stored into a IP SAN unit information list for the virtual storage service pool 11.

After storing information of the IP SAN unit, the control management modules 7 on the distribute control management station 3 sends back a "need SAN unit (n)'s storage info" packet to the IP SAN unit (n) 4.

When the SAN service modules 6 of the IP SAN unit (n) 4 receive the packet of "need SAN unit (n)'s storage info", the SAN service modules 6 obtain the storage information of the IP SAN units (n) 4, which may include the number of storage volumes, each of the storage volumes' starting address (logical block address, LBA), length, and the end address (logical block address, LBA). The SAN service modules 6 then send back a packet of "unit (n) storage info", which may include all information obtained, to the control management station 3.

After receiving the "unit (n) storage info" packet from the IP SAN unit (n) 4, the distribute control management modules 7 of the distribute control management station 3 update the stored information of the virtual storage service pool 11 with corresponding storage information of the IP SAN unit (n) obtained from the packet.

When the IP SAN unit number (n) is shutting down, the service module 6 of the IP SAN unit number (n) 4 sends a "Unit (n) shutdown" message to the distribute control management station 3. This shutdown message could be an SNMP trap of link down, or a simple UDP packet as illustrated in FIG. 4 with a message type of system down, or other short packet based on some other protocols.

After automatically detecting and receiving of the "unit (n) shutdown" packet from the IP SAN units number (n) 4, the distribute control management modules 7 of the distribute control management station 3 update the stored information of the virtual storage service pool 11 for the IP SAN unit (n) 4, for example, updating and marking the status of the IP SAN unit number (n) as down in a entry of the IP SAN unit information list. In addition, other information may be also required to be updated, for example, updating the total storage capacity of the virtual storage service pool.

After one or more IP SAN units 4 are brought online, the control management station 3 has owned the stored information of the storage volumes and network for each of the IP SAN units 4 in the virtual storage service pool 11. Therefore, the control management station 3 can control entire virtual SAN infrastructure. For example, the distribution control management station 3 is able to accept block data requests from each of the hosts 1 and distributed storage volumes to each of the hosts 1 based on the request in several steps as illustrated bellow in respect to the FIG. 6:

First, an exampled host 1 numbered as (1) sends a request to the control management station 3 for requesting a storage space, such as 80 GB (gigabyte) of a storage volume. Second, the control management station 3 stores information of the host 1 (1) and searches for availability of the 80 GB of storage volume. The control management station 3, for example, finds an 80 GB available storage volume being labeled as volume number (2) in an IP SAN unit 4 numbered as (M). Third, the control management station 3 sends the requested information of the host 1 (1) to the IP SAN unit 4 (M), wherein the requested information includes the IP address of the host 1 (1) and the requested storage size. The control management station 3 also sends information of the storage volume (2) in the IP SAN unit 4 (M) to the host 1 (1), wherein the information of the storage volume number (2) includes the IP address of the IP SAN unit 4 (M), the storage volume number and the size, the storage volume's starting address and ending logical address block (LBA). Therefore, all parties of three, namely the control management station 3 and the host 1 (1) and the IP SAN unit 4 (M) are synchronized for keeping a same mapping of the storage volume assignment information. Fourth, once the host 1 (1) and the IP SAN unit 4 (M) get each other's information, the host 1 (1) can directly and independently access the storage volume (2) of the IP SAN unit 4 (M) immediately and the IP SAN unit 4 (M), in one embodiment, is further configured to perform security checking in light of storage access by the host 1 (1).

Alternatively, the above described steps for distributing storage volume may also be semi-automatically setup with assisting of admin operations performed via the management console 10. For example, an administrator via the management console 10 of a console host 14 could manually setup the storage volume (2) of the IP SAN unit 4 (M) to be exclusively access by the host 1 (1) as long as the administrator acknowledges that the host 1 (1) needs such size of storage volume. The administrator can also manual setup the host 1 (1) with all information needed to access the storage volume (2) of the IP SAN unit 4 (M). Finally, the host 1 (1) can access to the storage volume (2) of the IP SAN unit 4 (M) directly without going through the control management station 3).

The present invention also discloses a mechanism of dynamically expanding storage capacity. After the distributed virtual SAN storage pool 11 is initiated and constructed, each of the hosts 1 will be able to access the storage volumes of any one of the IP SAN units 4 in the pool 11 directly without further involvement of the control management station 3. This will allow the virtual storage service pool 11 of the distributed virtual SAN infrastructure to continue expanding, for example by bring up one or more SAN storage units 4 online, without affecting any one of the hosts 1 to continue access to the assigned storage volumes on any one of the assigned IP SAN units 4 in the virtual storage service pool 11. This means that it guarantees the distributed virtual SAN storage pool 11 can be dynamically expanded without interrupting normal storage operations and access to the entire distributed virtual SAN storage pool 11.

The present invention further discloses a technique of system scalability. Once the distributed virtual SAN storage pool 11 is constructed, each of the hosts 1 can access one or more IP SAN units 4 in the virtual storage service pool 11 of the distributed virtual SAN infrastructure whenever each of the hosts 1 sends a request. For example, the host 1 (1) illustrated in FIG. 6 can access three IP SAN units that numbered as SAN unit 4 (1), unit (2), and unit (M) after the host 1 (1) requests for storage volumes and the control management station 3 grants each of the requests. This effectively provides scalable storage system for the hosts 1 (1) within distributed virtual SAN infrastructure. Further, the distributed virtual SAN infrastructure provides far better scalability than the in-band accessed virtual SAN as illustrated in FIG. 8, wherein the scalability of in-band accessed virtual SAN were severely limited by the bottlenecked control management station.

The present invention also discloses a method of storage sharing mechanism. Once the distributed virtual SAN storage pool 11 is constructed, each of the IP SAN units 4 in the virtual storage service pool may be configured with multiple storage volumes in the form of block data for accessed by one or more hosts 1. Therefore, the hosts (1) are allowed to share storage volumes on any one of the IP SAN units 4 by granting and assigning each of the hosts to exclusively access one of the storage volumes on the one of the IP SAN units 4. The FIG. 6 demonstrates such a storage sharing, wherein the IP SAN unit 4 number as (2) has three volumes, which named volume (1), volume (2), and volume (3). The block data service modules 6 of the IP SAN unit 4 (2) allows volume (1) to be accessed exclusively by the host 1 (1) while volume (2) to be accessed exclusively by a host 1 (2).

Figure 7:
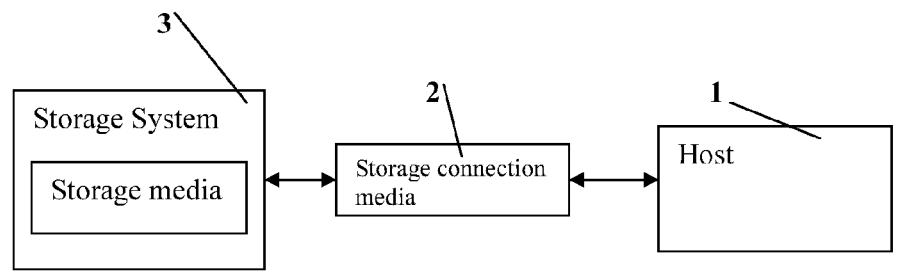
FIG. 7 is a conventional Direct Attached Storage System.

With in-band accessed virtual SAN as illustrated in FIG. 8, the control management station could be a performance bottleneck. With distributed virtual SAN of this invention, each of the hosts 1 can directly and independently access to any of the IP SAN units 4. Therefore, the performance of storage accessing for each of the hosts will not be affected and can match the performance of direct attached storage system as illustrated in FIG. 7 when the high speed network connecting media is deployed in the distributed virtual SAN infrastructure.

The present invention also illustrates a method of a centralized management of distributed virtual SAN. The storage management console 10 of a console host 14 can communicate with the console support software module 8 of a control management station 3. The storage management console 10 is configured to further receive information relating to all of the IP SAN units 4 from the control management modules 7 of the control management station 3. Therefore, via the storage management console 10, admin user can perform centralized management functionality for the entire SAN units 4 in the distributed virtual SAN storage pool 11, the hosts 1, and the control management station itself 3. With web based multiple concurrent tasks controlled by the console support software modules 8 of the control management station 3, the admin user via the storage management console 10 can perform a full range of system operations and tasks, where each of tasks and operations can be run concurrently within the storage management console 10 for throughout the entire distributed virtual SAN and the hosts 1. These management tasks include storage configuration, storage volume allocation, de-allocation, and assignment for storage distribution, storage partitioning and repartitioning, and monitoring of storage, network, and other resource usages and activities.

In one embodiment, the present invention discloses a process of disaster recovery capabilities. The use of DNS or an IP address identification mechanism helps this distributed virtual SAN infrastructure to overcome the geometric (region) limitation, and works well in a cross network domain environment or in a single network domain environment. Therefore, any of the IP SAN units 4 or hosts 1 as well as a control management station 3 could be anywhere on the corporate Intranet, department LAN, or Internet. As a result, the present invention can be used for an emergency or a disaster recovery plan because the distributed virtual SAN infrastructure that can go beyond 100 miles as oppose to the traditional 10-kilometer limitation.

In addition, the disaster recovery plan of distributed virtual SAN infrastructure can be flexibly implemented in one embodiment as showing in FIG. 10. With this recovery plan, the host 1 numbered as (1) or (3) can continue to operate even if one of mirrored IP SAN units 4, which serves the host (1) or host (3), failed. Also, a spare IP SAN unit 4 can be used to quickly replace the failed one of the IP SAN units 4 whenever there is a need. On the other hand, the hosts 1 illustrated in FIG. 10 also can be organized into a service pool for providing special services, such as distributing video services, distributed database pool, distributed security monitor services, and all other services provided cross the network or the World Wide Web. Therefore, whenever the host 1 (1) or (3) failed, a spare host 2 can quickly take over the host 1 (1) or the host 1 (3)'s assigned storage in a IP SAN unit 4 and replace the host 1 (1) or the host 1 (3) for continue providing services to the end user computing devices.

It should be noted that the storage of any IP SAN unit 4 can be shared and accessed by multiple hosts. To scale storage capacity, a host may be assigned to access multiple volumes capacities from multiple IP SAN units. In one embodiment, the storage access goes directly through communication link between hosts 1 and SAN units 4, which means that it is an out-band access. An advantage of using the present invention is that it has better performance and scalability than that in-band accessed virtual SAN. Furthermore, the present invention allows the virtual storage pool 11 to expand dynamically through adding more IP SAN units into the storage service pool 11 without interrupting systems operation.

The distributed virtual SAN infrastructure can be managed and monitored from a centralized console 10. Also, the IP based distributed virtual SAN infrastructure is a new type of central controlled distributed scalable virtual machine (CCDSVM). The software implemented in IP based distributed virtual SAN infrastructure represent a web based operating system model. Furthermore, the methods and principles of automatically building the IP based distributed virtual SAN storage pool can be applied to automatically build service pools for delivering various on-demand services to the end users or clients.

The invention claimed is:

1. A storage server comprising:
at least one network interface,
a plurality of storage devices, and program code configured to cause the storage server to automatically join a storage pool through execution of a storage pool construction protocol between a control server and the storage server across a network,
the storage pool construction protocol executed by the storage server comprising:
sending a packet automatically to the control server, the packet informing the control server that the storage server is going online upon the storage server being brought online,
wherein the control server stores, according to the packet received, identification information of the storage server for organizing the storage pool;
receiving an enquiry packet from the control server, the enquiry packet requesting storage information configured on the storage server;
sending a response packet to the control server, the response packet comprising the storage information which includes information of at least one storage volume configured in the storage server, to cause the control server to update the stored information of the storage server for the storage pool by including the storage information of the storage server obtained from the response packet.

2. The storage server of claim 1, wherein the identification of the storage server comprises: name and network address of the storage server.

3. The storage server of claim 1, wherein the at least one storage volume is created by using one or more of the storage devices in the storage server.

4. The storage server of claim 1, wherein said storage information comprises information about each of storage volumes in the storage server, including information about total number of the storage volumes, and starting address and size of the each of the storage volumes.

5. The storage server of claim 1, wherein the storage pool construction protocol executed further comprises: sending automatically by the storage server a status packet to the control server for the control server updating the status of the storage pool in response to the storage server being shutdown, or having a communication link down or up.

6. The storage server of claim 1, wherein said storage pool comprises at least the information of the storage server and information about another storage server connected remotely to the control server across said network.

7. The storage server of claim 1, wherein said network is a network infrastructure which includes corporate storage network backbone, corporate Intranet, the Internet, local area network, and wide area network, and comprises of wired and wireless communication links.

8. A storage server comprising:
at least one network interface, a plurality of storage devices and
program code configured to cause the storage server to:
receiving a first mapping remotely from a control server, the first mapping including information about a first storage volume configured on the storage server and about a first computing device assigned for access to the first storage volume,
wherein the first mapping is created by the control server after receiving a first request for a storage volume remotely from the first computing device and identifying, through a storage pool, the first storage volume which matches the requested storage volume,
wherein the storage pool includes storage information of the storage server, where the storage information is obtained by the control server through execution of a storage pool construction protocol between the storage server and the control server for the control server to organize the storage pool; and
utilizing the first storage volume to deliver storage service directly and remotely to the first computing device independent of the control server upon a successful validation of access permission based on the first mapping received.

9. The storage server of claim 8, wherein the storage information of the storage server includes information about each of storage volumes, the each of the storage volumes being configured by using one or more of the storage devices in the storage server.

10. The storage server of claim 9, wherein the information about the first storage volume includes starting address and size of the first storage volume.

11. The storage server of claim 8, further comprising: receiving a second mapping from the control server, the second mapping including information about a second storage volume configured on the storage server and about the first computing device assigned for access to the second storage volume.

12. The storage server of claim 11, wherein the storage server further utilizes the second storage volume to deliver storage service to the first computing device according to the second mapping.

13. The server of claim 8, further comprising: receiving a second mapping from the control server, the second mapping including information about a second storage volume configured on the storage server and about a second computing device assigned for access to the second storage volume.

14. The storage server of claim 13, wherein the storage server further utilizes the second storage volume to deliver storage service to the second computing device according to the second mapping.

15. The storage server of claim 8, wherein said storage server, control server are first computing device are connected by a network infrastructure which includes a corporate storage network backbone, corporate Intranet, the Internet, local area network, and wide area network.

16. A storage server comprising:
at least one network interface, and
a plurality of storage devices, and program code configured to cause the storage server to:
send information about the storage server to a control server via execution of a storage pool construction protocol between the control server and the storage server across a network, wherein the control server causes the displaying of the information about the storage server on an operation console of a console device; and
couple with the control server to carryout a request for operating a resource upon receiving the request transmitted from the operation console in response to a user, through the information displayed on the operation console, submitted the request for remotely operating the resource in the storage server.

17. The storage server of claim 16, wherein said operating a resource comprises:
configuring a storage volume by using the storage devices, allocating or de-allocating a storage volume, or monitoring activities of a storage volume in the storage server.

18. The storage server of claim 16, wherein said operating a resource comprises:
replicating data, or backing up or restoring data for a storage volume in the storage server.

19. The storage server of claim 16, wherein said console device is one of the control server or a remote console device across a network.

20. The storage server of claim 16, wherein said sending information about the storage server comprises: sending information about storage volumes, which includes the starting address and size of each of the storage volumes configured on the storage server, to the control server.

* * * * *

UNITED STATES PATENT AND TRADEMARK OFFICE
CERTIFICATE OF CORRECTION

Page 1 of 1

PATENT NO. : 9,106,677 B2
APPLICATION NO. : 14/530613
DATED : August 11, 2015
INVENTOR(S) : Sheng Tai Ted Tsao It is certified that error appears in the above-identified patent and that said Letters Patent is hereby corrected as shown below:

IN THE CLAIMS:

In col. 11, line 13, please replace "online" with ---online,---;

In col. 11, lines 37, 38, 49, 61, and 63, and
In col. 12, lines 17, 22, 26, 27, 37, 38, 55, and 59, and
In col. 13, lines 14 and 15, please replace "about" with ---of---.

Signed and Sealed this
Twenty-third Day of February, 2016

Michelle K. Lee
*Director of the United States Patent and Trademark Office*